United States Patent
Gera et al.

(10) Patent No.: US 9,436,673 B2
(45) Date of Patent: Sep. 6, 2016

(54) AUTOMATIC APPLICATION OF TEMPLATES TO CONTENT

(71) Applicant: Prezi, Inc., San Francisco, CA (US)

(72) Inventors: Zoltán Gera, Budapest (HU); Andrei Boghiu, Budapest (HU); Lior Paz, Haifa (IL); Péter Zimon, Budaörs (HU); Péter Polgár Balázs, Taksony (HU); Peter Arvai, San Francisco, CA (US)

(73) Assignee: Prezi, Inc, San Francisco, CA (US)

( * ) Notice: Subject to any disclaimer, the term of this patent is extended or adjusted under 35 U.S.C. 154(b) by 415 days.

(21) Appl. No.: 13/853,008

(22) Filed: Mar. 28, 2013

(65) Prior Publication Data

US 2014/0298218 A1    Oct. 2, 2014

(51) Int. Cl.
- G06F 3/0481    (2013.01)
- G06F 17/24     (2006.01)
- G06F 17/21     (2006.01)

(52) U.S. Cl.
CPC ........... G06F 17/248 (2013.01); G06F 3/0481 (2013.01); G06F 17/211 (2013.01)

(58) Field of Classification Search
None
See application file for complete search history.

(56) References Cited

U.S. PATENT DOCUMENTS

| | | | |
|---|---|---|---|
| 7,246,128 B2 * | 7/2007 | Jordahl | G06F 17/30601 |
| 7,707,503 B2 | 4/2010 | Good et al. | |
| 8,165,878 B2 * | 4/2012 | Roberge | G10L 15/08 704/243 |
| 8,225,234 B2 * | 7/2012 | Olander | G06F 3/0482 715/742 |
| 8,957,920 B2 * | 2/2015 | Giambalvo et al. | 345/660 |
| 2002/0035501 A1 * | 3/2002 | Handel | G06F 9/4443 705/7.32 |
| 2002/0059325 A1 * | 5/2002 | Beizer | G06F 17/30008 |
| 2003/0055871 A1 * | 3/2003 | Roses | G06F 17/3089 709/203 |
| 2003/0090504 A1 * | 5/2003 | Brook et al. | 345/716 |
| 2006/0041558 A1 * | 2/2006 | McCauley | G06F 17/30309 |
| 2006/0150088 A1 * | 7/2006 | Kraft | G06F 17/248 715/249 |
| 2006/0193538 A1 * | 8/2006 | Vronay et al. | 382/305 |
| 2007/0094248 A1 * | 4/2007 | McVeigh | G06F 17/3089 |
| 2007/0182743 A1 * | 8/2007 | Aguera y Arcas | 345/440 |
| 2007/0192739 A1 * | 8/2007 | Hunleth et al. | 715/823 |
| 2009/0265632 A1 | 10/2009 | Russ et al. | |
| 2012/0017147 A1 * | 1/2012 | Mark | 715/702 |
| 2012/0110519 A1 * | 5/2012 | Werner et al. | 715/863 |

* cited by examiner

*Primary Examiner* — Phenuel Salomon

(74) *Attorney, Agent, or Firm* — Schwegman Lundberg & Woessner, P.A.

(57) ABSTRACT

An apparatus and method applying a layout template to content are disclosed herein. A plurality of content included in a visual workspace is automatically grouped into one or more clusters, one or more content of the plurality of content being at different spatial position from each other. At least one cluster is automatically located to a respective content placeholder included in the layout template. The clusters with the layout template are presented in accordance with the automatically locating of the clusters.

27 Claims, 16 Drawing Sheets

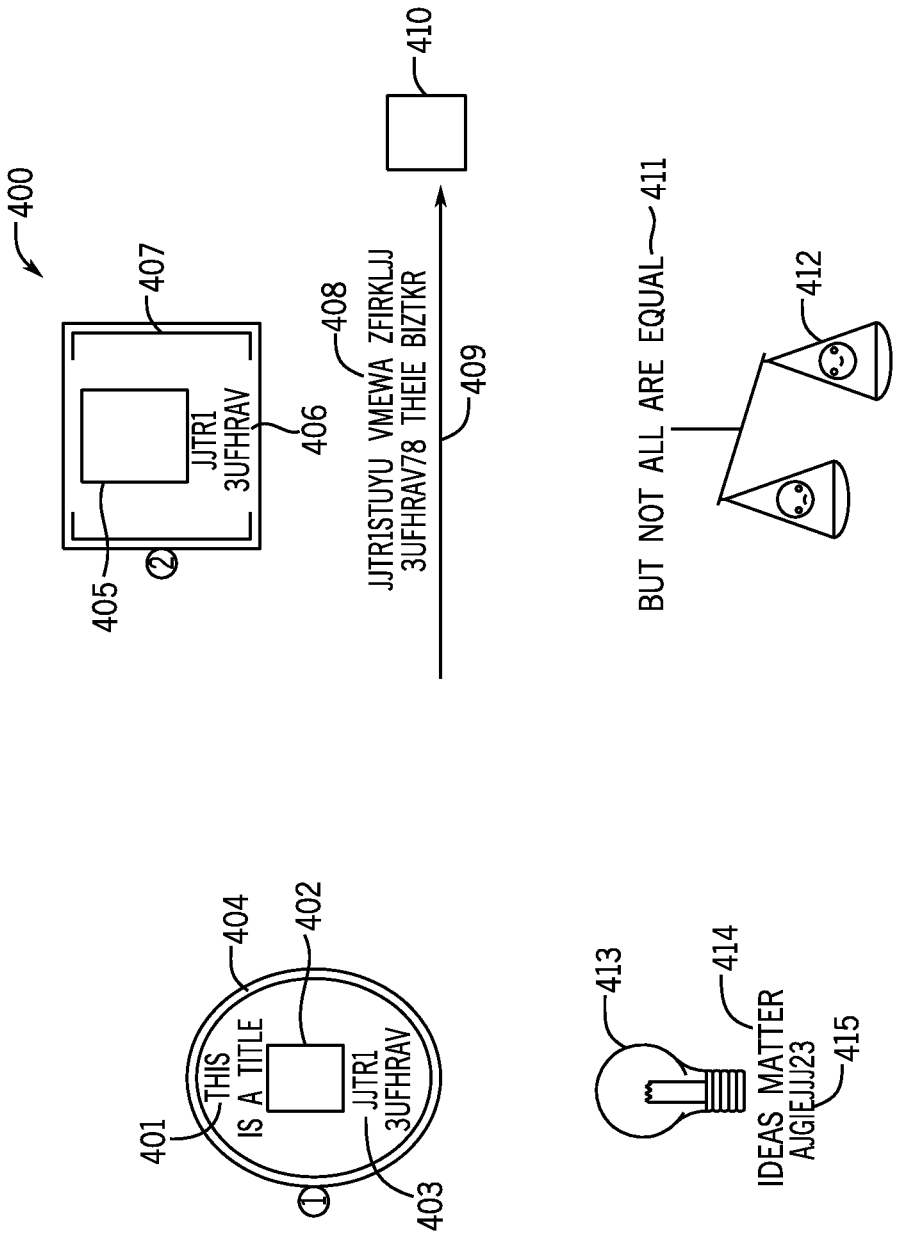

AUTOMATIC APPLICATION OF TEMPLATES TO CONTENT

TECHNICAL FIELD

The present application relates generally to systems and methods for displaying content, and in particular, in some embodiments, for formatting display of content.

BACKGROUND

Information conveyed by content, such as text, images, video, graphics, audio, and/or other forms of visual information, may be improved based upon how such content is organized or presented to users. Presentation options may be provided to users using templates, each template configured around a particular theme (e.g., color, style, organizational philosophy, font, static vs. animated, visual effects, etc.). Templates automatically provide certain presentation elements so that users need not start from scratch in putting together presentation of content.

Typically, a user selects a template and then creates content within the selected template. If a template change is desired after or during content creation, users may be required to manually re-arrange existing content to fix within the new template or otherwise address differences in content treatment between the old and new template. The extra work associated with changing templates discourages trying out different templates on existing content, even though a different template from the initially-selected template may be better suited for the content. Additionally, the user may not know which template is preferable prior to content creation.

Thus, it would be beneficial to apply a template to content at anytime during a presentation creation process. It would be beneficial to be able to change templates at anytime during the presentation creation process. It would further be beneficial for content to be automatically fitted to the selected template and the user given the option to participate in application of the selected template to the content.

BRIEF DESCRIPTION OF THE DRAWINGS

Some embodiments are illustrated by way of example and not limitations in the figures of the accompanying drawings, in which:

FIGS. 4A-4K illustrate example screens or graphical user interface (GUI) associated with implementing auto-layout templates according to some embodiments.

The headings provided herein are for convenience only and do not necessarily affect the scope or meaning of the terms used.

DETAILED DESCRIPTION

Described in detail herein is an apparatus and method for automatically applying a visual layout template to content. An auto layout mechanism automatically groups existing content that may be spatially distributed in a presentation, document, file, page, screen or other (single or common) content creation space into one or more clusters/groups. Content may comprise one or more of text, image, video, graphic, audio, or other visual information. Each cluster/group is comprised of one or more content that is related to each other. The auto layout mechanism additionally automatically determines which cluster/group is matched to which of the content placeholders included in the template. Accordingly, the template and content are displayed together, the content arranged to fit inside the content placeholders of the template in a logical order. A user may modify the particular application of the template to the content to finalize application of the template to content.

The following description is presented to enable any person skilled in the art to create and use a computer system configuration and related method and article of manufacture to determine content characteristics and apply to auto-layout templates. Various modifications to the example embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
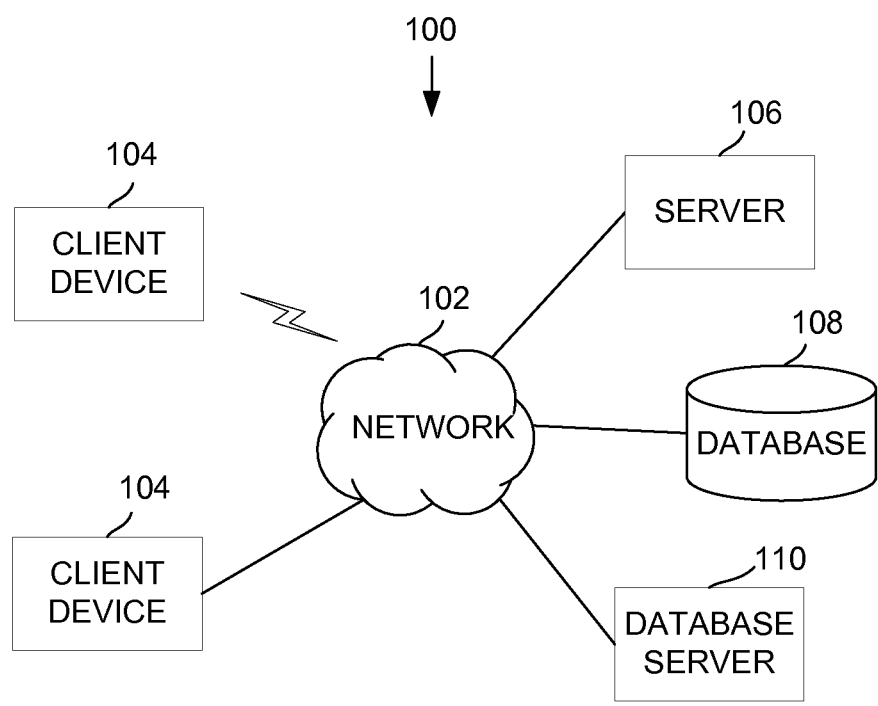
FIG. 1 illustrates a network diagram depicting an example system for facilitating automatic application of templates to content according to some embodiments.

FIG. 1 illustrates an example system 100 for implementing an auto-layout template according to some embodiments. The system 100 includes a network 102, a plurality of client devices 104, a server 106, a database 108, and a database server 110. Each of the client devices 104, server 106, database 108, and database server 110 is in communication with the network 102.

The network 102 comprises a wired and/or wireless communications network such as, but not limited to, a WiFi network, a WiMax network, a local area network (LAN), a wide area network (WAN), a metropolitan area network (MAN), a wireless local area network (WLAN), a wireless wide area network (WWAN), a wireless metropolitan area network (WMAN), a wireless virtual private network (WVPN), an ad hoc network, an intranet, an extranet, a virtual private network (VPN), a portion of the Internet, the Internet, a portion of a public switched telephone network (PSTN), a cellular network, or a combination of two or more such networks. When the network 102 comprises a public network, security features (e.g., VPN/SSL secure transport) may be included to ensure authorized access within the system 100. Although not shown, the network 102 can include, without limitation, servers, databases, switches, routers, base stations, repeaters, software, firmware, intermediating servers, and/or other components to facilitate communication between devices in the system 100. The network 102 may comprise one or more networks, for example, a cellular network in communication with the Internet.

Each of the plurality of client devices 104 comprises a mobile communication device capable of wired and/or wireless communication with the network 102. Each of the client devices 104 comprises a computer or computing device including, but not limited to, a cellular or mobile phone, smart phone, tablet, portable digital assistant (PDA), Internet appliance, hand-held device, wireless device, portable device, laptop, netbook, ultrabook, wearable computers, multi-processor systems, microprocessor-based or programmable consumer electronics, mini-computers, and the like. In some embodiments, each of the client devices 104 includes, but is not limited to, an input sensor (e.g., camera, bar code reader, machine readable information reader, physical keyboard, virtual keyboard provided using software on a touch screen), transceiver, storage unit, display (e.g., touch screen), one or more input mechanisms (e.g., keyboard, trackball, trackpad, touch screen), and a processor. The processor is in communication with and configured to coordinate control of each of the input sensor, transceiver, storage unit, display, and input mechanisms. Client devices 104 can be geographically distributed from each other and/or the network 102. Although two client devices 104 are shown in FIG. 1, more or less than two client devices can be included in the system 100.

Each of the client devices 104 further includes one or more applications (also referred to as "apps") such as, but not limited to, a web browser, messaging application, electronic mail (email) application, content creation, layout, and presentation application, one or more apps acquired from an application store or library, and interface and communication capabilities to communicate with one or more components within the system 100. In some embodiments, if a certain application (e.g., content creation, layout, and presentation application) is included in a given client device 104, then this application is configured to locally provide the user interface and at least some of its functionalities with the application configured to communicate with the network 102, on an as needed basis, for data and/or processing capabilities not locally available (such as templates or content clusterization determination). Conversely if the application is not included in a client device 104, the client device 104 may use its web browser to access a content creation, layout, and presentation service or site (or a variant thereof) hosted on the server 106. In still other embodiments, depending on the processing and/or storage capacity of the client device 104, at least certain functionalities/ operations described herein may be provided by the server 106, database 108, and/or database server 110 on behalf of the client device 104.

Server 106 comprises one or more computers or processors configured to communicate with the client devices 104, databases 108, and/or database servers 110 via the network 102. The server 106 is configured to host one or more applications accessed by the client devices 104; to host one or more websites accessed by the client devices 104; to provide processing functionalities for the client devices 104; to provide data, templates, web pages, etc. to the client devices 104; to track and monitor activities associated with the client devices 104; and/or facilitate access to and store information in the databases 108. In some embodiments, the server 106 includes one or more web servers, one or more application servers, one or more servers providing user interface (UI) or graphical user interface (GUI) functionalities in connection with implementation of auto-layout templates, one or more servers to apply templates to user content, one or more servers to provide templates to users, one or more servers including content clusterization determination mechanism, and the like.

Database 108 comprises one or more storage devices configured to store data and/or instructions for use by client devices 104, server 106, and/or database server 110. The content of database 108 is accessed via the network 102, directly by the server 106, and/or database server 110. The content of database 108 includes, but is not limited to, a plurality of templates, associated template information, and the like.

Database server 110 comprises one or more computers or processors configured to facilitate access to the content of database 108. Although not shown, database server 110 may be directly connected to the database 108. Database 108 and database server 110 may be located at one or more geographically distributed locations from each other and also from the server 106. Alternatively, database 108 and/or database server 110 may be included within server 106. As another alternative, database server 110 may be optional when its functionalities/operations are performed by server 106.

Further, while the system 100 shown in FIG. 1 employs a client-server architecture, embodiments of the present disclosure is not limited to such an architecture, and may equally well find application in, for example, a distributed or peer-to-peer architecture system.

Figure 2:
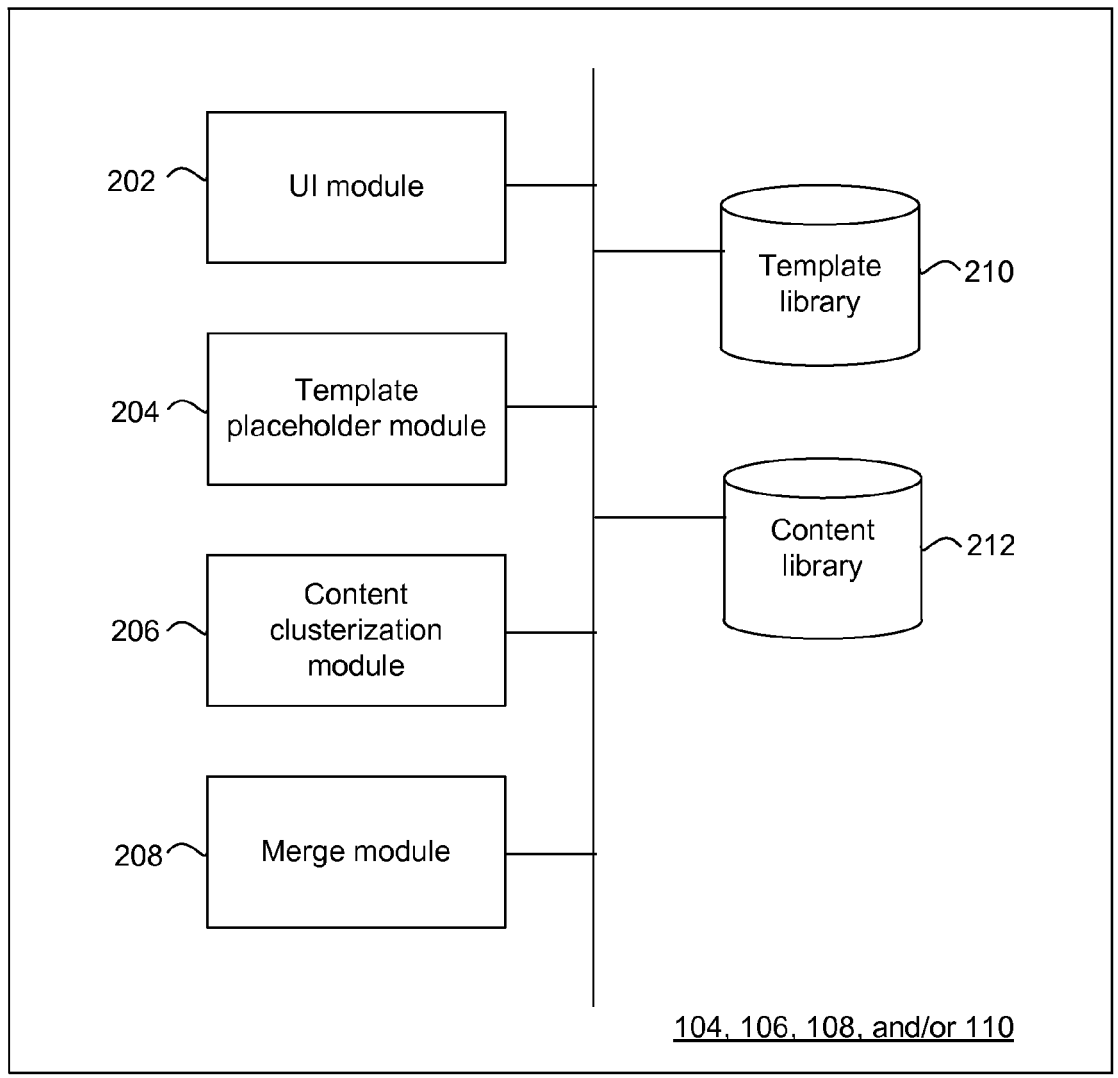
FIG. 2 illustrates a block diagram of additional details of the example system of FIG. 1 implemented in modules according to some embodiments.
Figure 3:
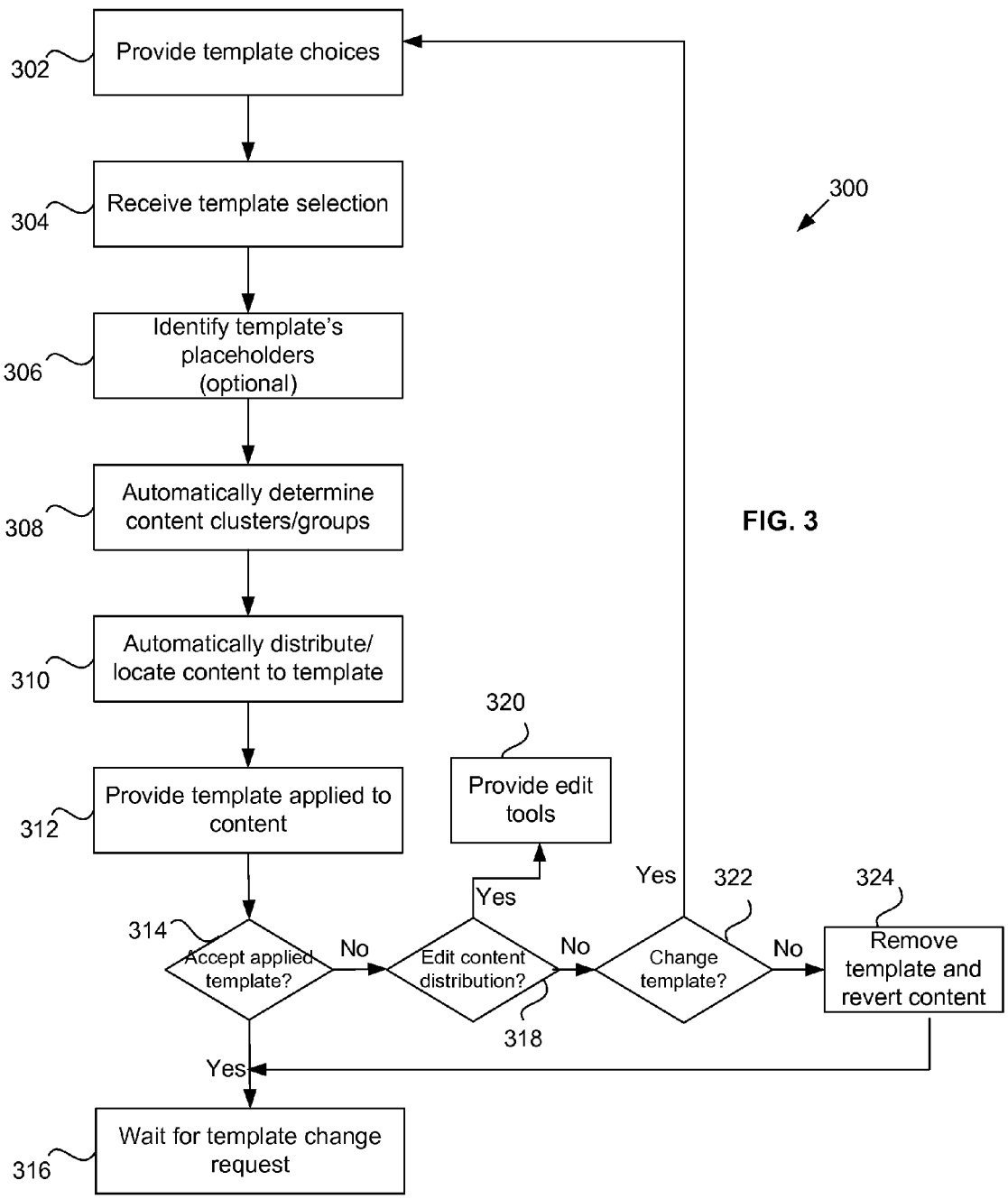
FIG. 3 illustrates a flow diagram showing functionalities or operations implemented by the modules of FIG. 2 according to some embodiments.

FIG. 2 illustrates a block diagram showing example modules and libraries/data structures/databases included in the server 106, database 108, database server 110, and/or client devices 104 to implement the operations and functionalities of FIG. 3 according to some embodiments. The modules of FIG. 2 comprise one or more software components, programs, applications, apps, or other units of code base or instructions configured to be executed by one or more processors. The modules include a user interface (UI) module 202, a template placeholder module 204, a content clusterization module 206, and a merge module 208. The modules 202-208 can communication with each of a template library 210 and a content library 212, in which libraries 210, 212 may be included in database 108. Although modules 202-208 are shown as distinct modules in FIG. 2, it should be understood that modules 202-208 may be implemented as fewer or more modules than illustrated. It should also be understood that any of modules 202-208 may communicate with one or more components included in the system 100, such as server 106, database 108, database server 110, or client device 104. Similarly, libraries 210 and 212 are shown as distinct libraries in FIG. 2. However, it is understood that the content of libraries 210, 212 may be stored in fewer or more libraries than illustrated.

FIG. 3 illustrates an example flow diagram 300 for implementing auto-layout templates according to some embodiments. FIGS. 4A-4K illustrate example screens or graphical user interface (GUI) associated with implementing auto-layout templates according to some embodiments. FIGS. 5A-5C illustrate example display of content provided on a canvas at different zoom levels when the GUI comprises a zooming user interface (ZUI). FIGS. 2, 3, 4A-4K, and 5A-5C are discussed below in conjunction with each other.

At a block 302 of flow diagram 300 (FIG. 3), a user interface (UI) module 202 provides one or more template choices to a user via a display of a client device 104. One or more templates may be stored (and updated and maintained)

in the template library 210. The template library 210 may also include information associated with one or more of the templates such as template property information, as discussed in detail below. A template comprises a document, file, overlay, or layer having a preset visual format (e.g., layout, color, style, organizational philosophy, font, visual effects, static vs. animated, content presentation order, etc.), and includes one or more placeholders at respective distinct spatial locations into which content may be placed. The placeholders, also referred to as content placeholders, content buckets, or main topic holders, comprise frames or an object type. The templates are also referred to as layout templates, auto-layout templates, or visual templates.

Template choices may be presented to the user in response to a user request for templates. Alternatively, templates may be presented to the user upon starting an app, website, or other event for which selection of a template may be beneficial. Block 302 may be performed at any time within the content, presentation, or document creation process (e.g., prior to any content existing, during content creation, after content creation, revision of content, and the like).

As an example, templates choices may be presented to the user after at least some content has been created. FIG. 4A illustrates an example screen 400 showing various text and images existing at different spatial locations of a presentation, document, file, page, screen, virtual whiteboard, canvas, or other (single or common) content creation space. Text, images, video, graphics, audio, and/or other forms of visual information (collectively referred to as content or display elements) are shown in screen 400, namely, content 401, 402, 403, 404, 405, 406, 407, 408, 409, 410, 411, 412, 413, 414, 415.

In some embodiments, content (e.g., content 401, 402, 403, 404, 405, 406, 407, 408, 409, 410, 411, 412, 413, 414, 415) is created or displayed in a zooming user interface (ZUI). A ZUI is a type of graphical user interface (GUI) in which the scale of a viewed area is changed in order to view more detail or less, and to browse through and among different visual display elements such as text, images, shapes, documents, or videos. Display elements may be added to a (visual) workspace referred to as a "canvas" to create a zoomable presentation in which details and subtopics can be presented through zooming in and out to reveal more or less detail. The canvas is larger than a viewing window generated on a device display screen, and a user can scroll a viewing window to view different display elements. The ZUI differs from a normal canvas in that the user may zoom in or out onto a particular display element. Display elements can be inserted anywhere among the presentation content, in addition to grouping display elements within frames. Users can pan across the canvas in two dimensions and zoom into objects of interest. Display elements present inside a zoomed region can in turn be zoomed themselves to reveal additional detail, allowing for recursive nesting and an arbitrary level of zoom. For example, as a user zooms into a text object, the text may be represented initially as a small dot, then as a thumbnail image, next as a complete page and finally as a magnified view of a portion of the page focused on a key passage from the text. Thus, ZUIs use zooming as the primary metaphor for browsing through multivariate or hyperlinked information. Display elements present inside a zoomed region can, in turn, be zoomed themselves to reveal additional detail, allowing for recursive nesting and an arbitrary level of zoom.

FIGS. 5A-5C are illustrative drawings showing display elements or content viewed through a viewing window disposed on a canvas at three different zoom levels. FIG. 5A shows a viewing window 500 through which portions of display elements 502 and 504 are visible but in which display elements 506, 508, 510, 512 are not visible. The viewing window 500 can be panned across the canvas (or a portion of the canvas) in any direction. FIG. 5B shows a zoomed out view of the same canvas in which display elements 502-512 are visible through the viewing window 500. FIG. 5C shows a zoomed in view of display element 502 on the same canvas through the viewing window 500.

Figure 4B:
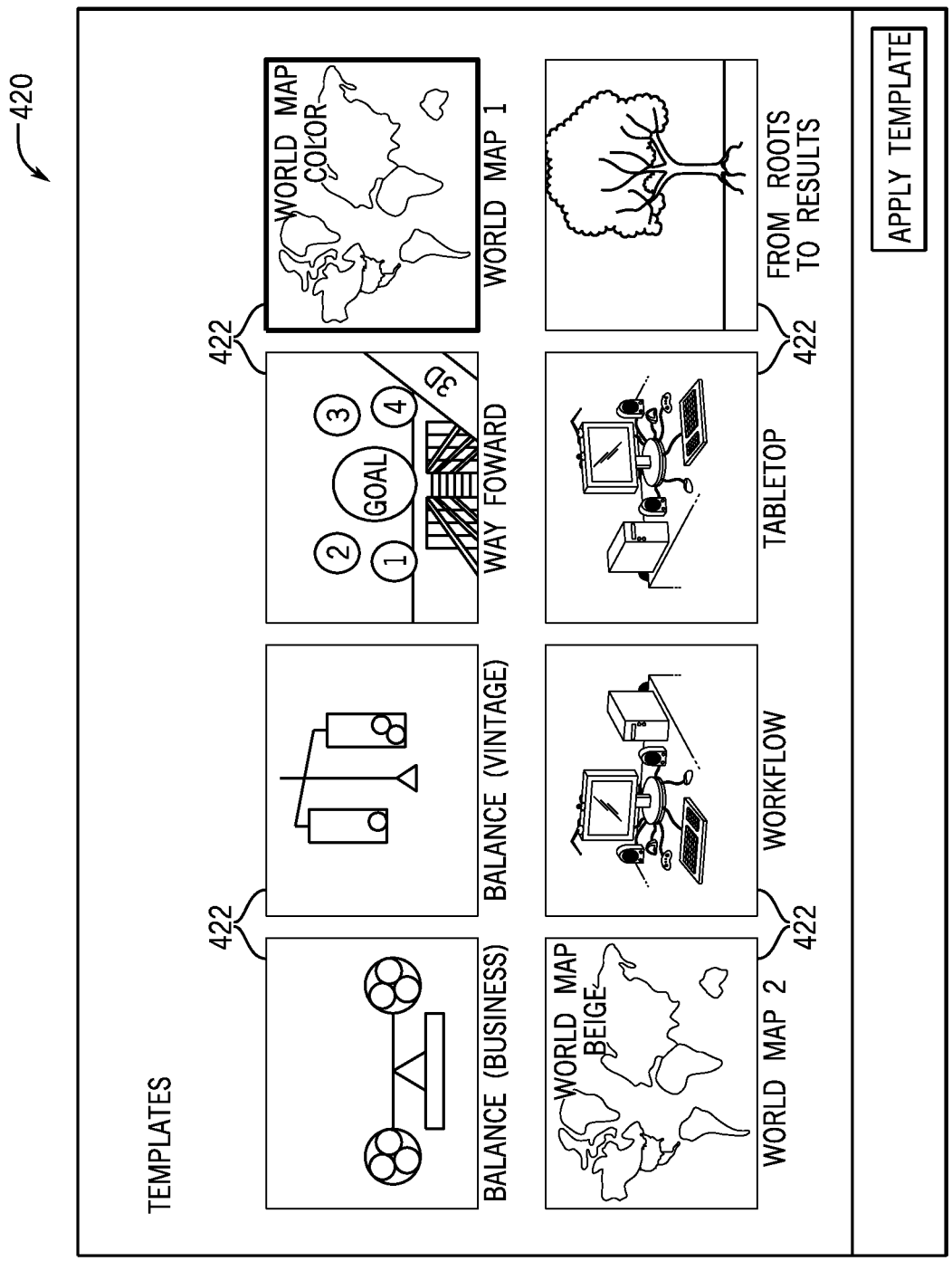
Figure 4C:
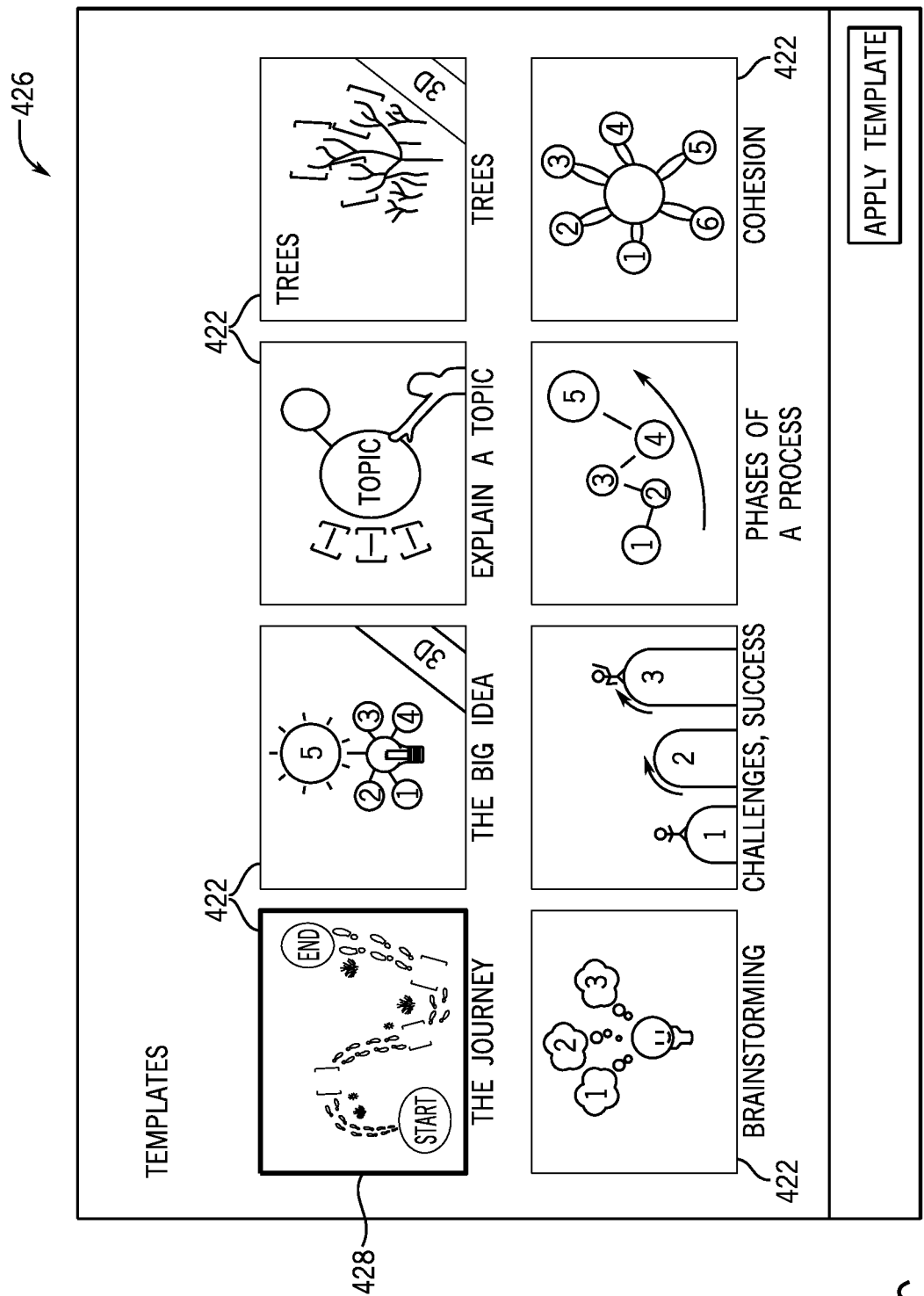
Figure 5A:
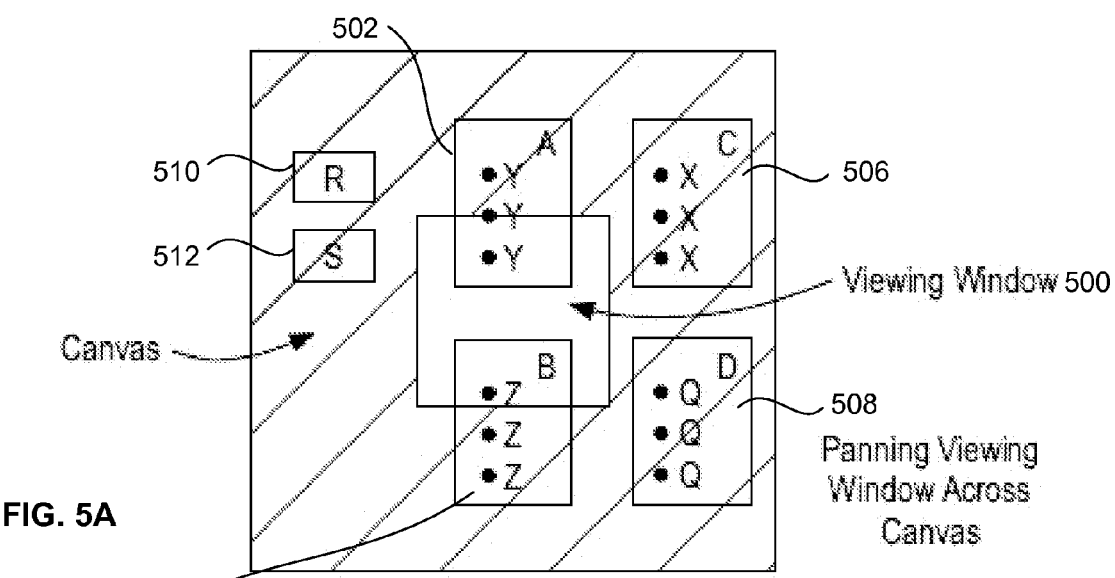
FIGS. 5A-5C illustrate example display elements viewed through a viewing window disposed on a canvas at three different zoom levels according to some embodiments.
Figure 5B:
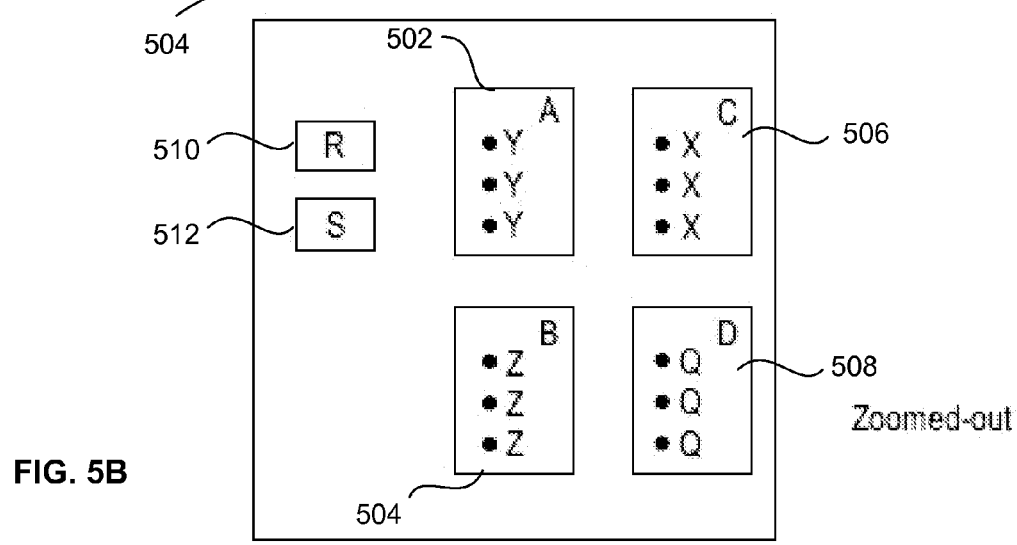
Figure 5C:
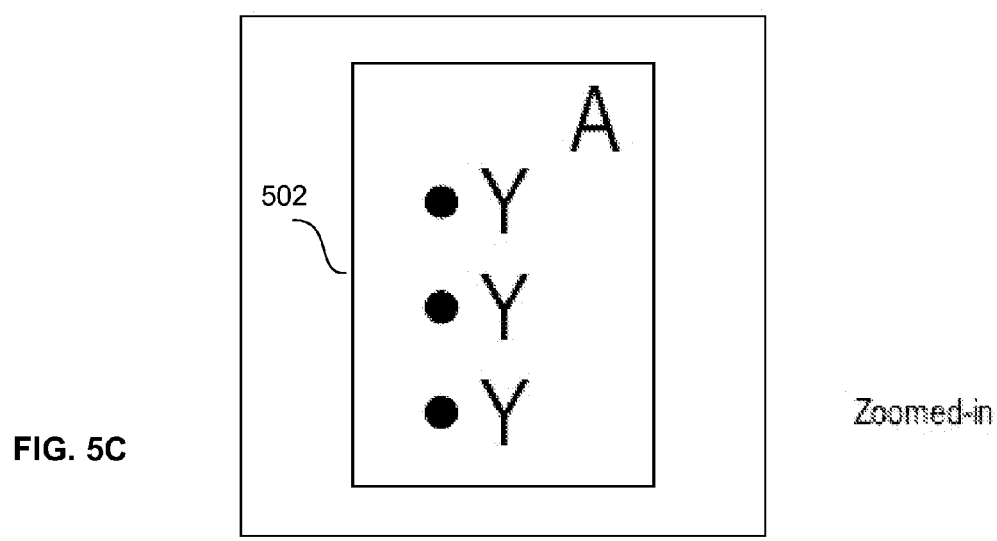

FIGS. 4B-4C illustrate example screens 420 and 426, respectively, showing a plurality of template choices 422. Each of the template choices may be represented by an icon, thumbnail, or other textual/visual information associated with the respective templates, such representations stored in the template library 210. Although eight template choices are shown in FIG. 4B, it is understood that less or more templates may be provided as choices.

Next at a block 304, the UI module 202 receives the user's selection of a template (or user's indication of interest in a template) via the user's client device 104. The user may have clicked, tapped, or otherwise indicated interest in one of the presented template choices. The template placeholder module 204 identifies the number, location, size, and other properties of each placeholder included in the selected template (block 306). In some embodiments, at least the spatial location of each placeholder may be identified, for example, by Cartesian coordinates corresponding to the outer boundary of each given placeholder. Alternatively, block 306 may be optional when placeholder information corresponding to the selected template is known. The template library 210 (or other component within system 100) may include template property information (e.g., placeholder locations) for each template, and the template property information may be stored in the respective template (e.g., as metadata) or be associated with the respective template. Template designers may provide the template property information as each template is completed.

FIG. 4C shows user selection of a template 428 from among the plurality of templates 422.

Next at a block 308, in response to a template selection, the content clusterization module 206 (also referred to as the content cluster/group determination module) automatically determines or identifies clusters/groups of the existing content. The content and associated content information (e.g., spatial location, size, orientation, creation date/time, and other content properties) may be locally stored on the user's client device 104 and/or remotely stored in the content library 212 (e.g., database 108). The content clusterization module 206 clusters/groups the content based on, without limitation, the position, distance, rotation, size, and/or distribution of the content relative to each other. Containment (e.g., within the same frame), visibility on a path point (e.g., visible on a display at the same time), and/or the aspect ratio of the display (or other display size considerations) may also be taken into account by the content clusterization module 206 to determine the clusters/groups. The number of clusters/groups identified within the content creation space (e.g., canvas) may be less, equal, or more than the number of placeholders for the selected template.

For example, the content clusterization module 206 first analyzes the relatedness of different content to each other based on their respective spatial positions (e.g., smaller distance between two content more likely to be related to each other), and then other indicators are studied such as relative rotation, size, or distribution to finalize determination of which content belongs together in each cluster/group. As another example, first content positioned close to second content and the first and second content additionally having the same rotation relative to each other may indicate that the first and second content are related to each other and proper to cluster/group together. As still another example, text that is sized smaller than nearby image/video/graphic may indicate that the text and image/video/graphic relate to each other and should be clustered/grouped together. In another example, content within the same frame are kept together in the same cluster; or if content is likely to fit in a display of the user's client device 104, then there is a higher chance that such content will be grouped together in the same cluster/group.

Figure 4D:
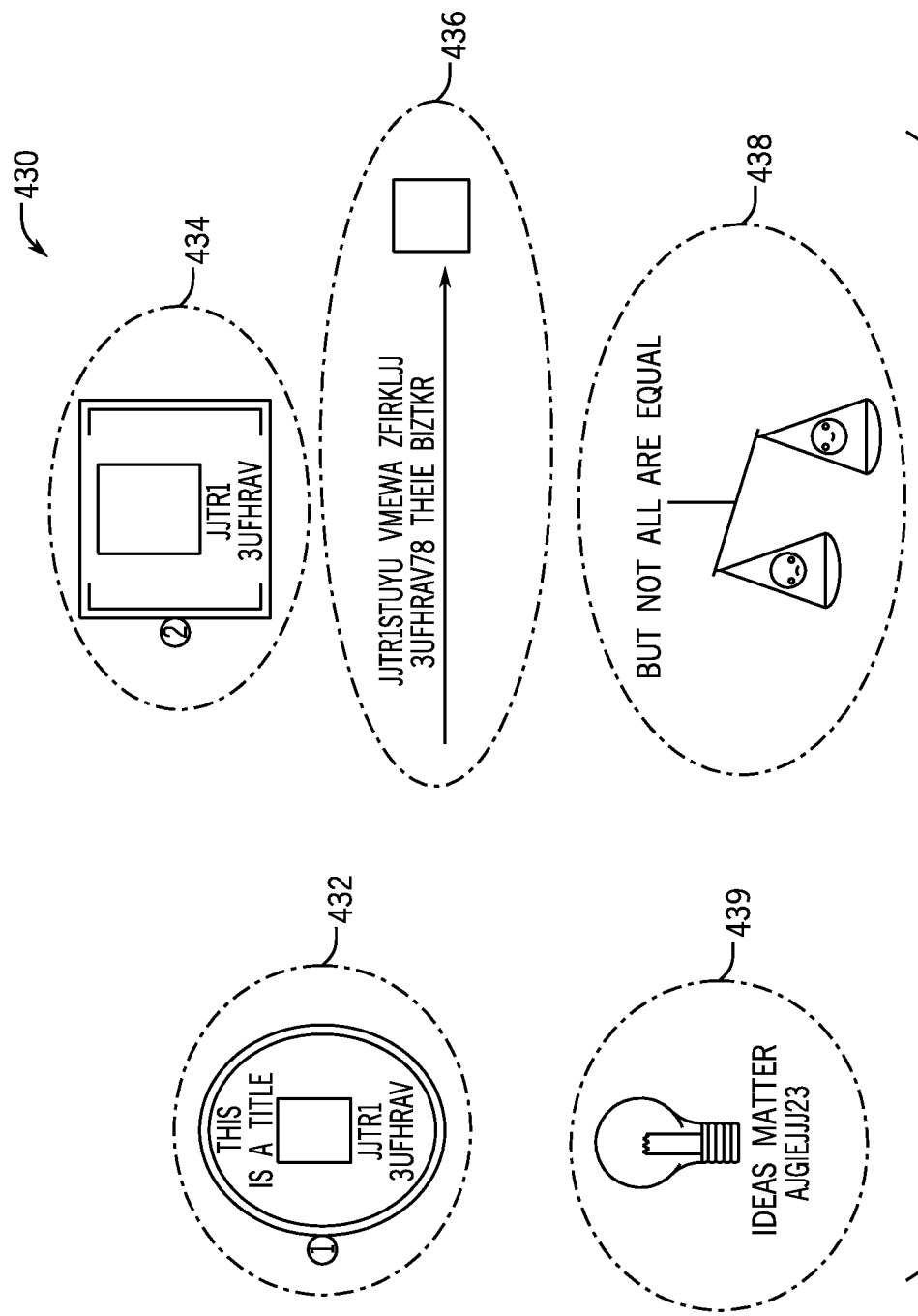

FIG. 4D illustrates an example conceptual screen 430 showing content 401-415 of FIG. 4A classified into different clusters/groups 432, 434, 436, 438, 439 in accordance with the cluster/group determination algorithm or rules included in the content clusterization module 206. Content 401, 402, 403, 404 are deemed related to each other and grouped together in cluster/group 432; content 405, 406, 407 comprise cluster/group 434; content 408, 409, 410 comprise cluster/group 436; content 411, 412 comprise cluster/group 438; and content 413, 414, 415 comprise cluster/group 439. Note that conceptual screen 430 may not be shown to the user in some embodiments. It illustrates the result of the clusterization determination.

Once the existing content has been divided and allocated into clusters/groups, the merge module 208 automatically applies the selected template to the existing content (block 310). The merge module 208 distributes or (re)positions the content corresponding to each cluster/group to each respective placeholder of the selected template. The original spatial position/location of the content (e.g., as shown in screen 400 of FIG. 4A) may be changed depending upon where the particular "matching" placeholder is in the template. The content comprising the given cluster/group is moved or relocated to the same spatial position/location of its matching placeholder. The content comprising the given cluster/group may also be resized in order to fit within its designated placeholder. If resizing occurs, however, all the content of the given cluster/group are resized by the same amount so that the original emphasis or other information intended to be conveyed by the one or more (related) content comprising the given cluster/group is maintained. Similarly, depending on the orientation set for a given placeholder, all of the content comprising a given cluster/group may be reoriented (e.g., rotated by a certain degree) relative to its original orientation. In general, whatever format or style dictates of a given placeholder, if such dictates require the content comprising a cluster/group to be adjusted accordingly, all of the content comprising the cluster/group will be affected so that the original content information is not changed relative to other content within the same cluster/group.

In the case where the number of clusters/groups identified in block 308 exceeds the number of placeholders of the selected template, the merge module 208 distributes more than one cluster/group to particular placeholder(s) in order to fit all the clusters/groups into the available number of placeholders. In some embodiments, the merge module 208 may determine super groups of clusters/groups (e.g., a larger cluster/group comprising more than one cluster/group identified in block 308) based on, without limitation, containment (e.g., within the same frame), visibility on a path point (e.g., visible on a display at the same time), and/or the aspect ratio of the display (or other display size considerations).

In some embodiments, which cluster/group (or super group of clusters/groups) to distribute to which placeholder is based on the sequential order of content creation (e.g., date and time stamp associated with the content comprising a given cluster/group). Templates, as well as presentations or documents in general, facilitate conveying a particular topic in a logical progression or "telling a story." This means that certain content is more meaningful when provided before other content. Assuming that users tend to create content in their logical progression order, the date/time stamp corresponding to content may be used as a proxy for the logical progression order of the content. The order of the template placeholders may be pre-specified by the template designer (e.g., included as template information in template library 210); left to right order may be assumed, for example, for English language content; or the template itself may indicate the viewing order of its placeholders (e.g., a flow diagram with arrows, numbering scheme, top to bottom, etc.). In other embodiments, which cluster/group is distributed to which placeholder may be based on other criteria, such as the result of context recognition algorithm applied to the existing content to determine what the content in each cluster/group means or the user specifies which cluster/group is matched to which placeholder.

The content clusterization module 206 and/or the merge module 208 may perform one or more "clean-up" or exceptions handling operations in connection with determining and/or distributing clusters/groups. For example, if content or a cluster/group is too large to fit within a placeholder, then the merge module 208 may redistribute such items to the extremities of the presentation (e.g., not fit within a placeholder). As another example, background images or overview frames—although they are existing content within the content creation space—may be ignored for purposes of determining the clusters/groups. Such content may also be placed in the extremities of the presentation.

Figure 4E:
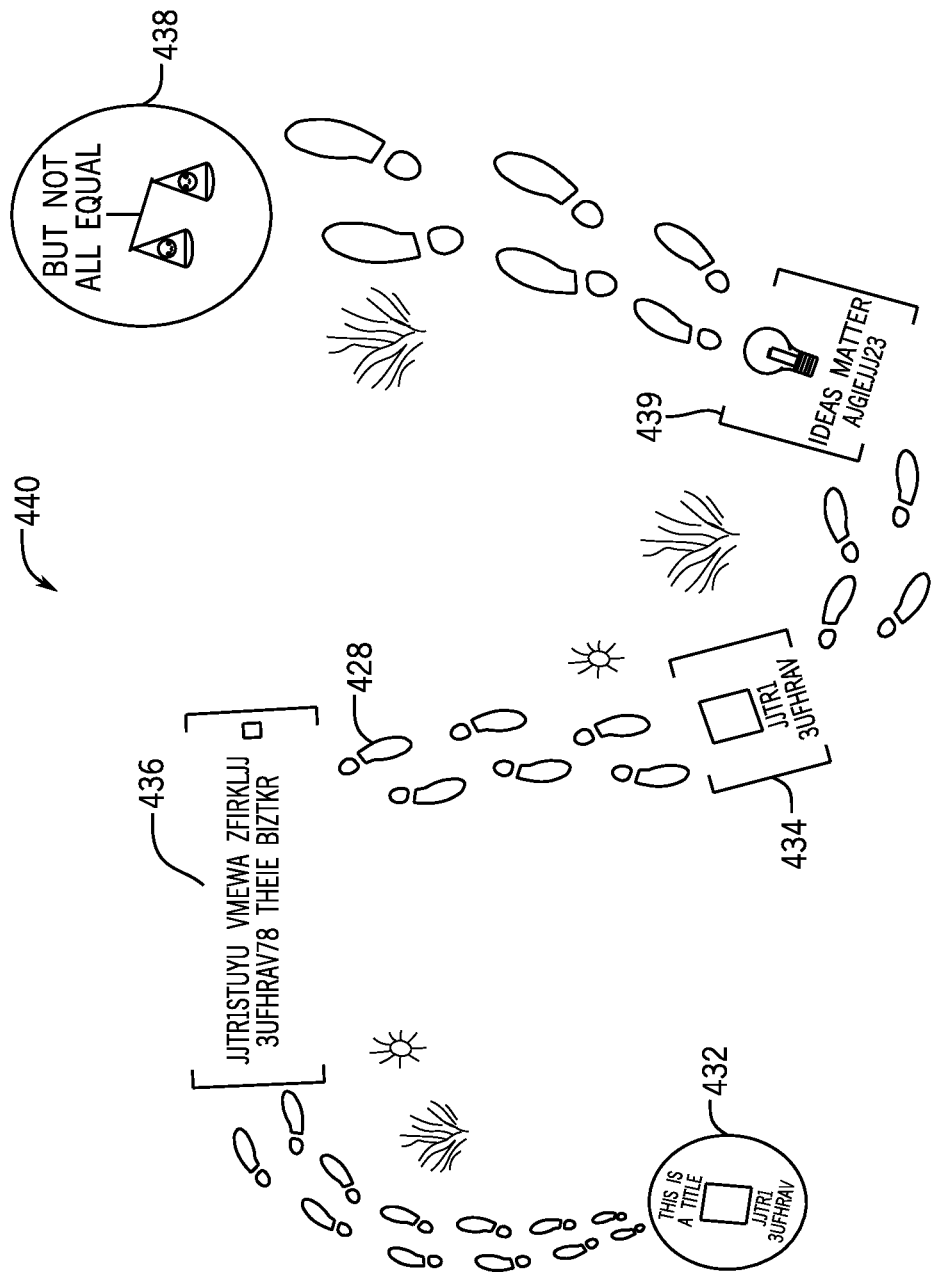

Next at a block 312, the UI module 202 provides or displays the selected template applied to the existing content in accordance with the automatic content distribution of block 310 to the user via the user's client device 104. FIG. 4E illustrates an example screen 440 showing the selected template 428 with the plurality of clusters/groups 432-439 identified in FIG. 4D inserted, moved, or otherwise properly positioned within the respective placeholders of the selected template 428. Notice the change in spatial position, size, orientation, and/or reordering among the clusters/groups after merging with the template 428 relative to the clusters/groups prior to application of the template 428. Additionally, template 428 shows an order for its placeholders at least by progressively increasing the size of footprints going from the left to the rightward direction.

Screen 440 of FIG. 4E corresponds to a viewing window of a ZUI (such as viewing window 500 of FIGS. 5A-5C) in some embodiments. When a template is applied to content provided in a ZUI environment, such template is applied to (all) content within the ZUI canvas or visual workspace. Even if some of the content is not visible at the time that a template is applied due to the particular zoom level and/or position of the viewing window, it is understood that the system 100 automatically groups and distributes (all) content present on a canvas and applies it to the template. Accordingly, the user may zoom in or out and/or pan in any direction of the displayed template with the distributed content, similar to the discussion above with respect to FIGS. 5A-5C. Application of a template does not change the capabilities of the ZUI environment. As an example, the user may still zoom into the upper right corner of the screen 440 to view more details about the content comprising cluster/group 438. Because the template and the plurality of content are now in fixed position relative to each other, zooming in on the upper right corner of the template also comprises zooming in on content distributed at the same portion of the template.

The display of the template automatically applied to the user's content comprises a provisional or proposed application of the template to the user. The user is given the option to accept, cancel, or revise the proposed content distribution within the template. If the user accepts the proposed template application (yes branch of block 314), then system 100 (e.g., UI module 202) waits for the next user input such as user selection of a different template (block 316). If the user does not accept the proposed template application (no branch of block 314), then the UI module 202 provides additional user options such as an editing option, template change option, or cancellation of proposed template application option.

If the user elects to edit the content distribution in the proposed template application (yes branch of block 318), then the UI module 202 is configured to provide edit tools to the user (block 320). The user may then manually redistribute the content in the selected template. The user may decide which content comprises a cluster/group and/or which cluster/group (either decided automatically or manually after initial template application) is matched to a particular placeholder. If the user elects to change the current template (yes branch of block 322), then template choices are again presented to the user (returns to block 302) and the process described above is repeated with respect to the latest template selection. If the user decides not to accept the proposed application of the template, nor edit the content distribution within that template, nor change the template, then the user has elected to cancel the application of the present template to his/her content (no branch of block 322). As such, the template is not applied and the content layout within the content creation space reverts back to their previous positions (e.g., prior to application of the latest template) (block 324).

The user may try out one or more templates for a given content. Accordingly, flow diagram 300 may be performed each time a template is to be applied to content. Not only is a presentation or document's spatial layout automatically provided by the template, content created prior to the currently selected template is automatically organized and arranged inside the template. Although block 306 is shown before block 308 in FIG. 3, it is contemplated that blocks 306 and 308 may be performed simultaneously with each other.

Figure 4F:
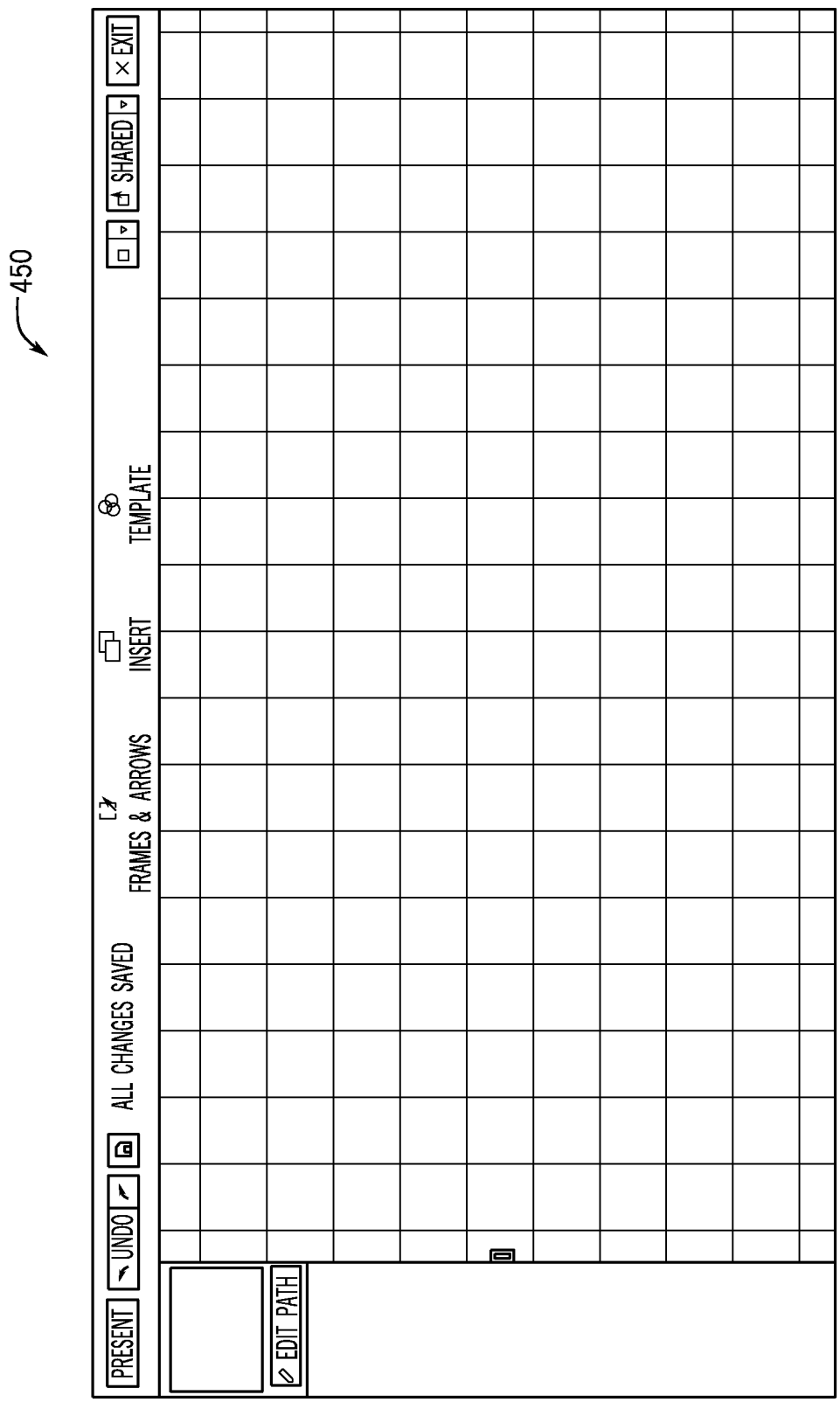
Figure 4G:
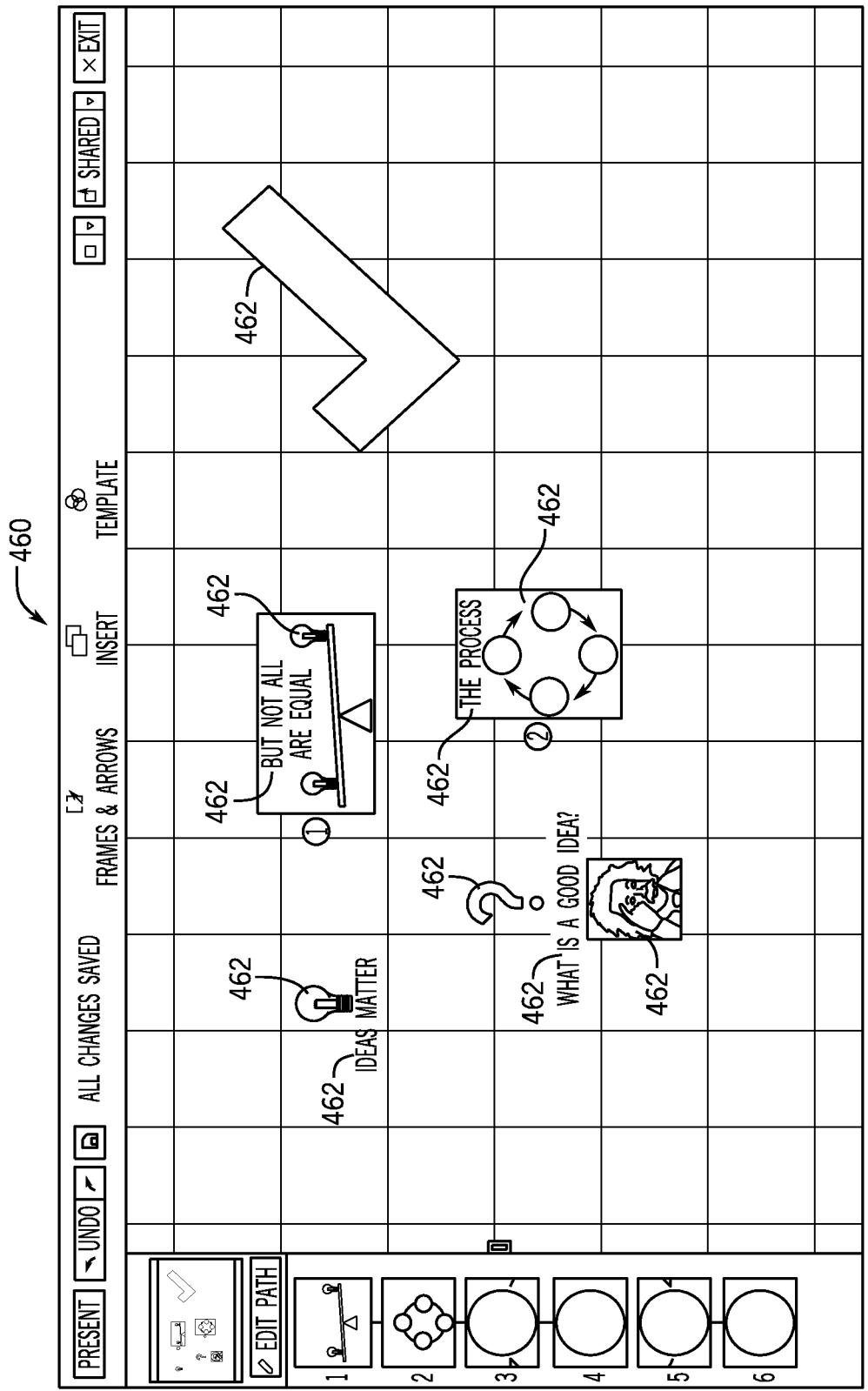
Figure 4H:
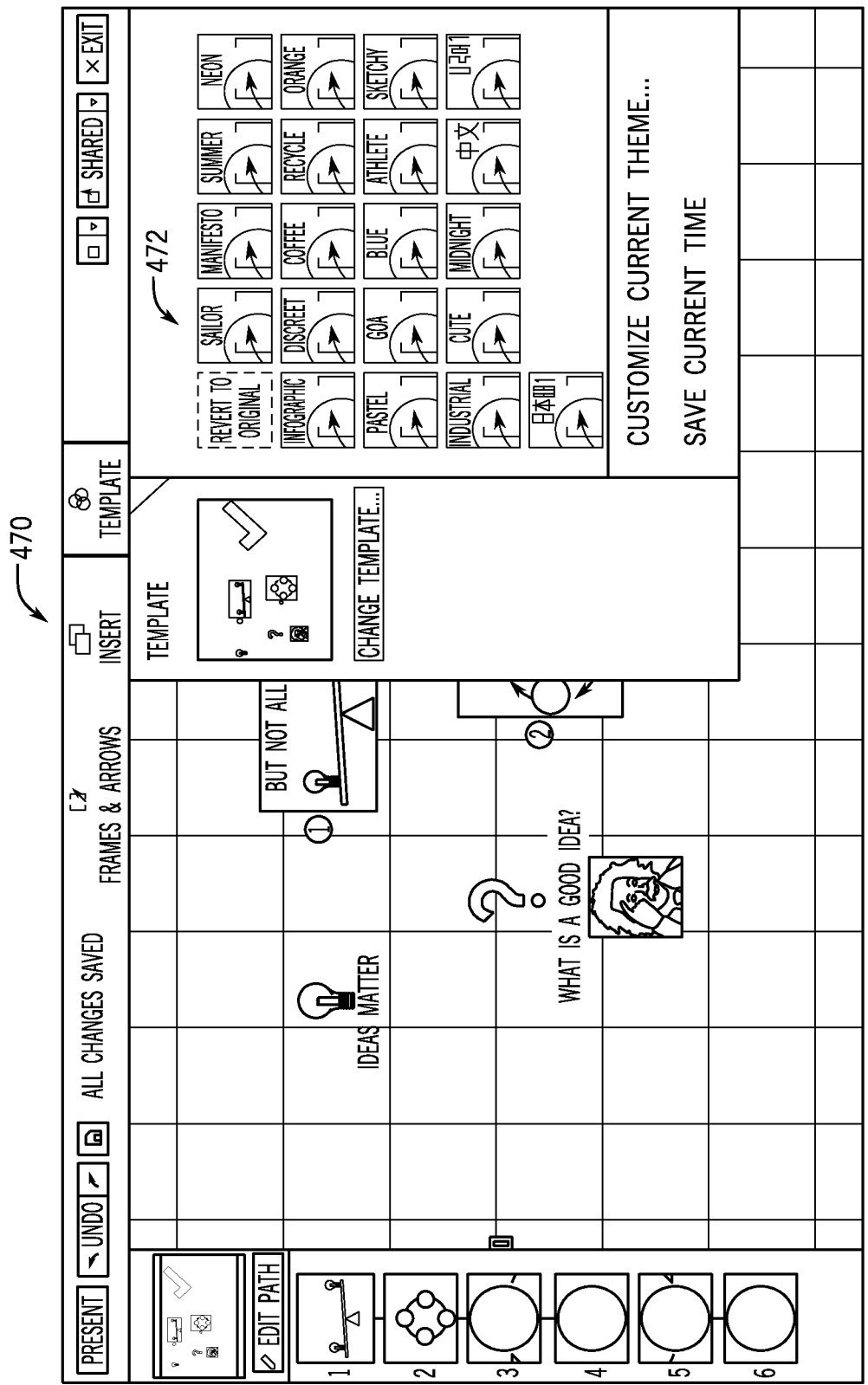
Figure 4I:
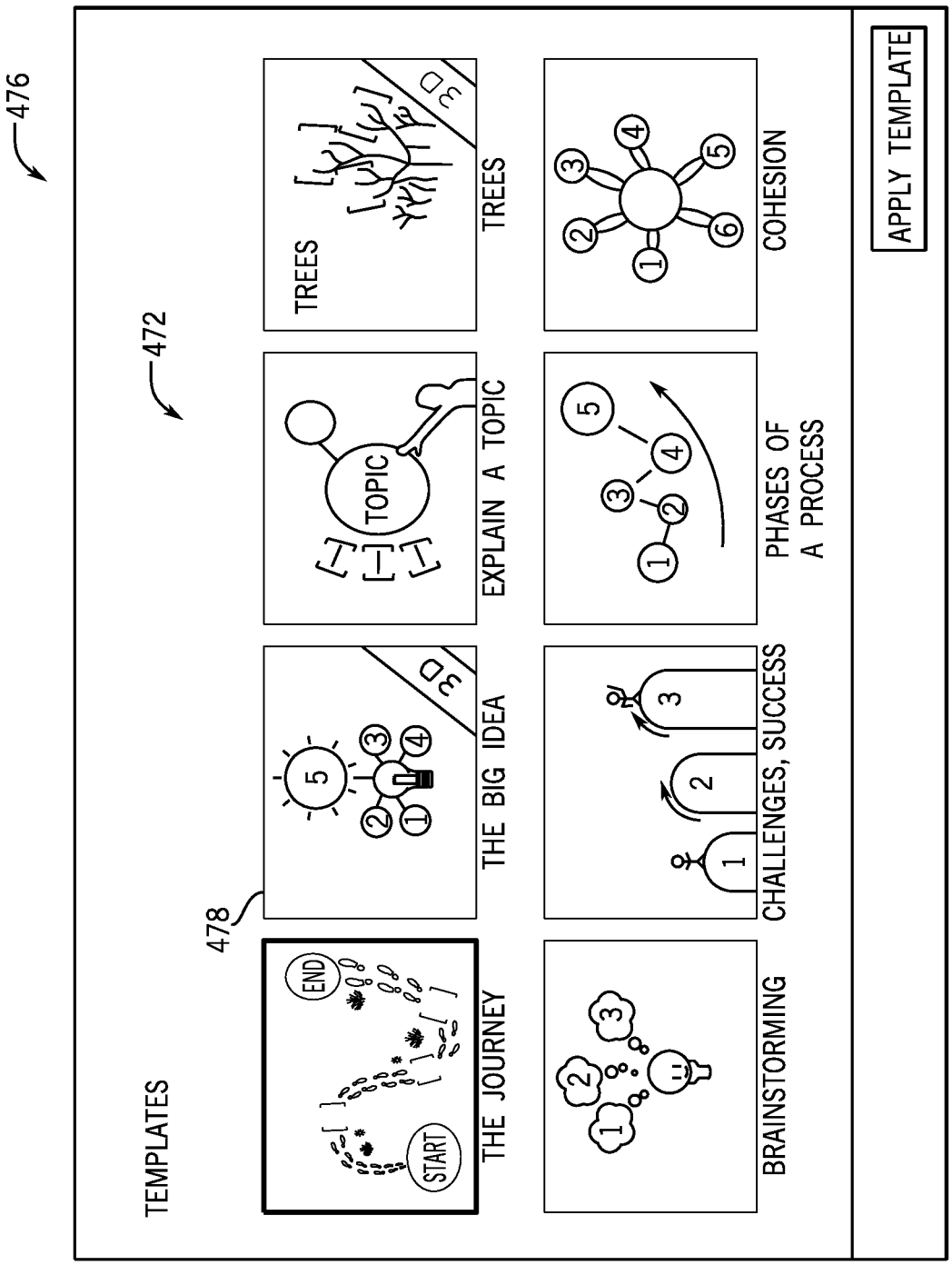
Figure 4J:
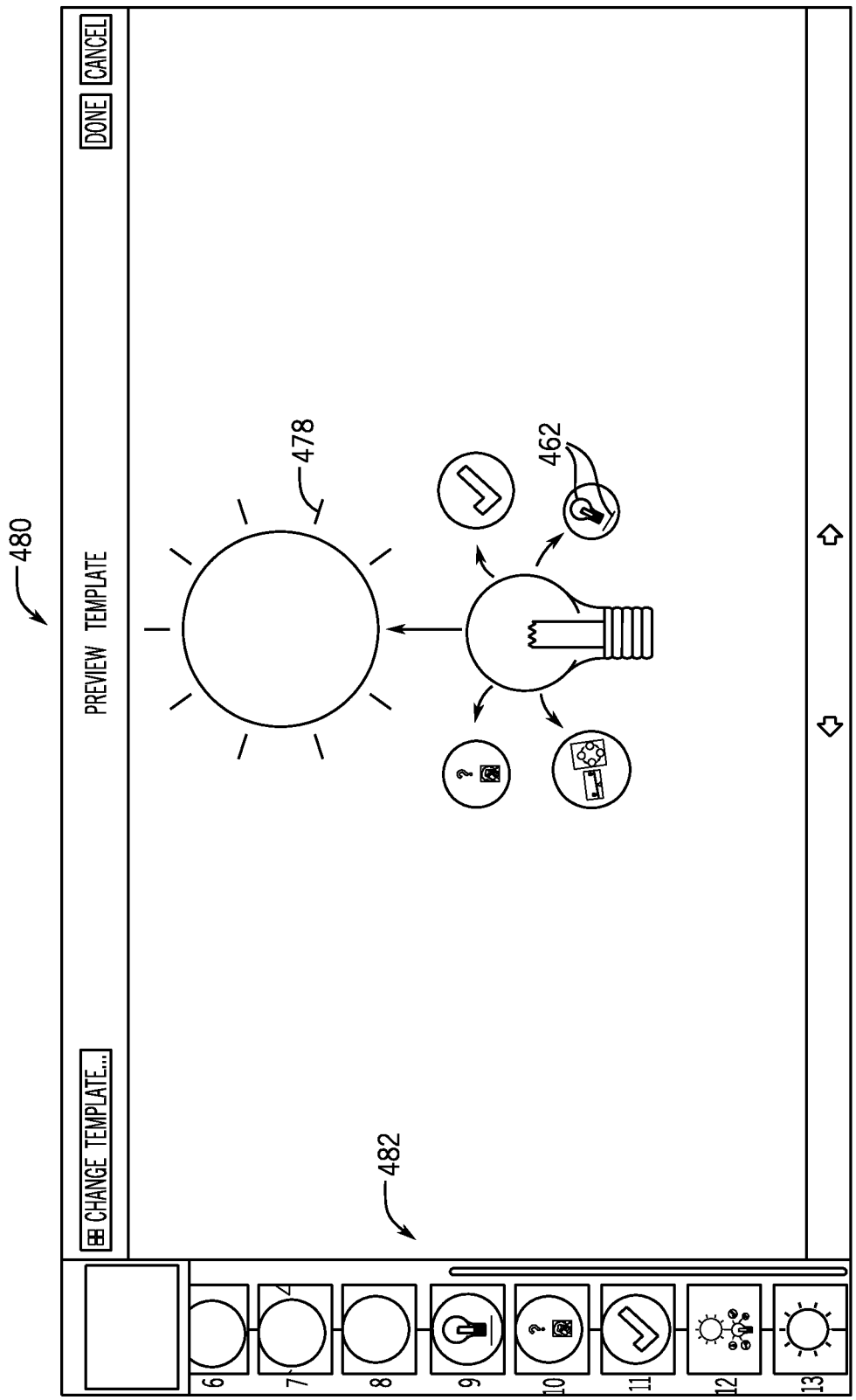
Figure 4K:
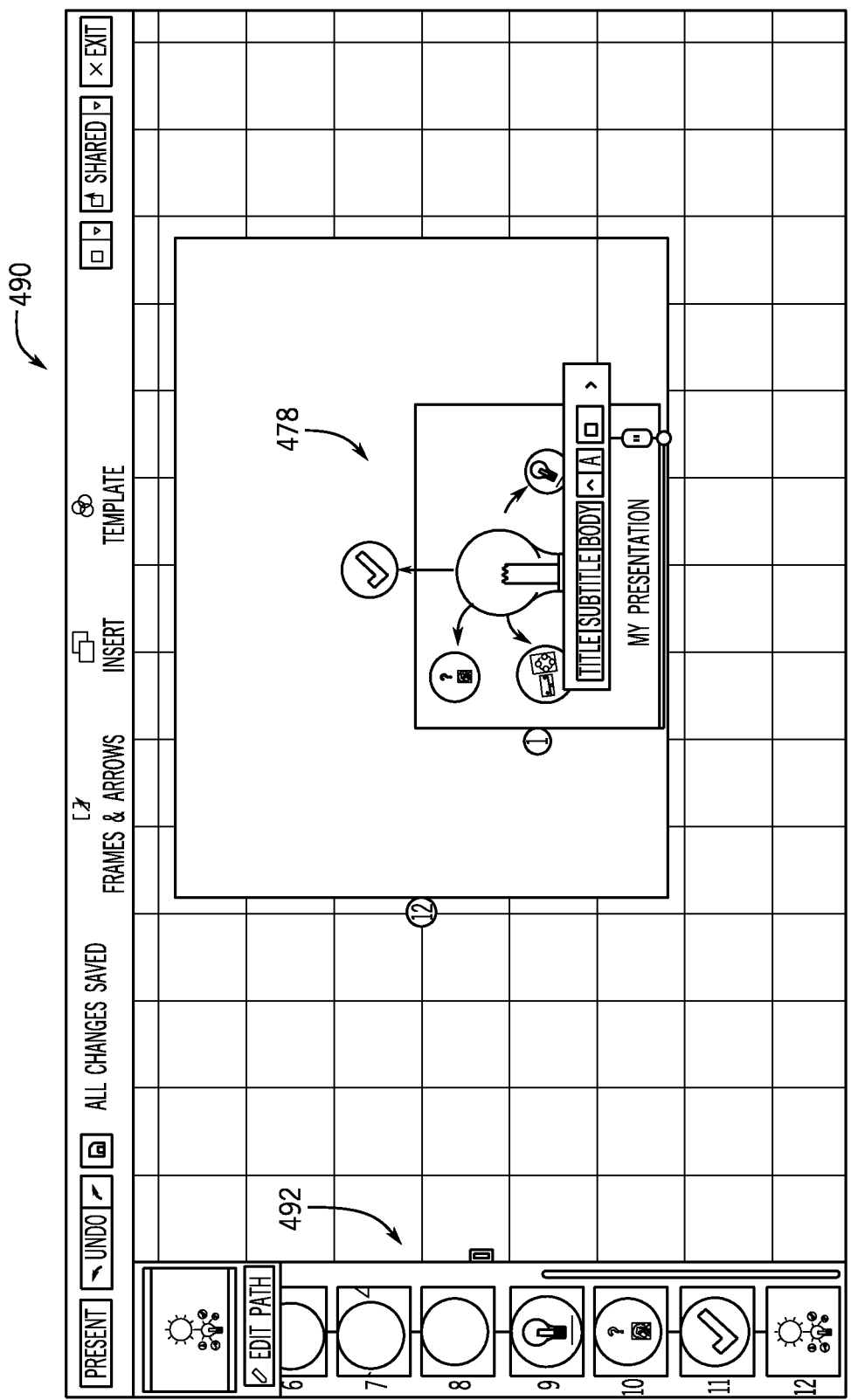

FIGS. 4F-4K illustrate another example for automatically applying a template according to some embodiments. FIG. 4F illustrates an example screen 450 showing a presentation, document, file, page, screen, or other (single or common) content creation space with no content created. FIG. 4G illustrates an example screen 460 showing the presentation, document, or other content creation space of FIG. 4F now populated with content (e.g., created by the user, copy and pasted by the user from another presentation, document, file, page, screen, or other (single or common) content creation space). A plurality of content 462 is shown spatially distributed or located in the presentation, document, file, page, screen, or other (single or common) content creation space. FIG. 4H illustrates an example screen 470 showing a plurality of template choices 472. The plurality of template choices 472 may be presented in a separate window, drop-down window, overlay window, etc. FIG. 4I illustrates an example screen 476 showing additional plurality of template choices 472, of which a template 478 is selected. FIG. 4J illustrates an example screen 480 showing the selected template 478 automatically applied to the content 462 and displayed to the user as a "preview." The left side of screen 480 includes a visual representation of each of the placeholders 482 of the template 478, and where a particular subset of the content 462 (a given content cluster/group) has been placed inside (or matched to) a particular placeholder, such content 462 is also shown. FIG. 4K illustrates an example screen 490 showing edit tools 492 along the left side for the user to modify the "preview" screen of FIG. 4J to rearrange content clusters/groups among the template placeholders and/or redesignate particular content to a given cluster/group.

In this manner, a template can be applied to content at any time during the content creation process. Even if a template has already been applied to content, the template can be changed for a different template as many times as desired. When a template is to be applied to content, the auto layout mechanism is configured to automatically group the content into one or more clusters/groups. Each cluster/group comprises one or more content components (e.g., text, image, video, graphic, audio, or other visual information) that are deemed to be related to each other and suitable for grouping together with each other. The auto layout mechanism is also configured to automatically determine which cluster/group should be arranged in which content placeholder of the (current) template. Thus, in response to user interest in a particular template, the particular template is displayed to the user with the existing content automatically grouped and arranged within the respective placeholders of the particular template. The user may then accept the proposed treatment of the content in the template, edit the application of the template to the content, cancel the template application, or try a different template.

Figure 6:
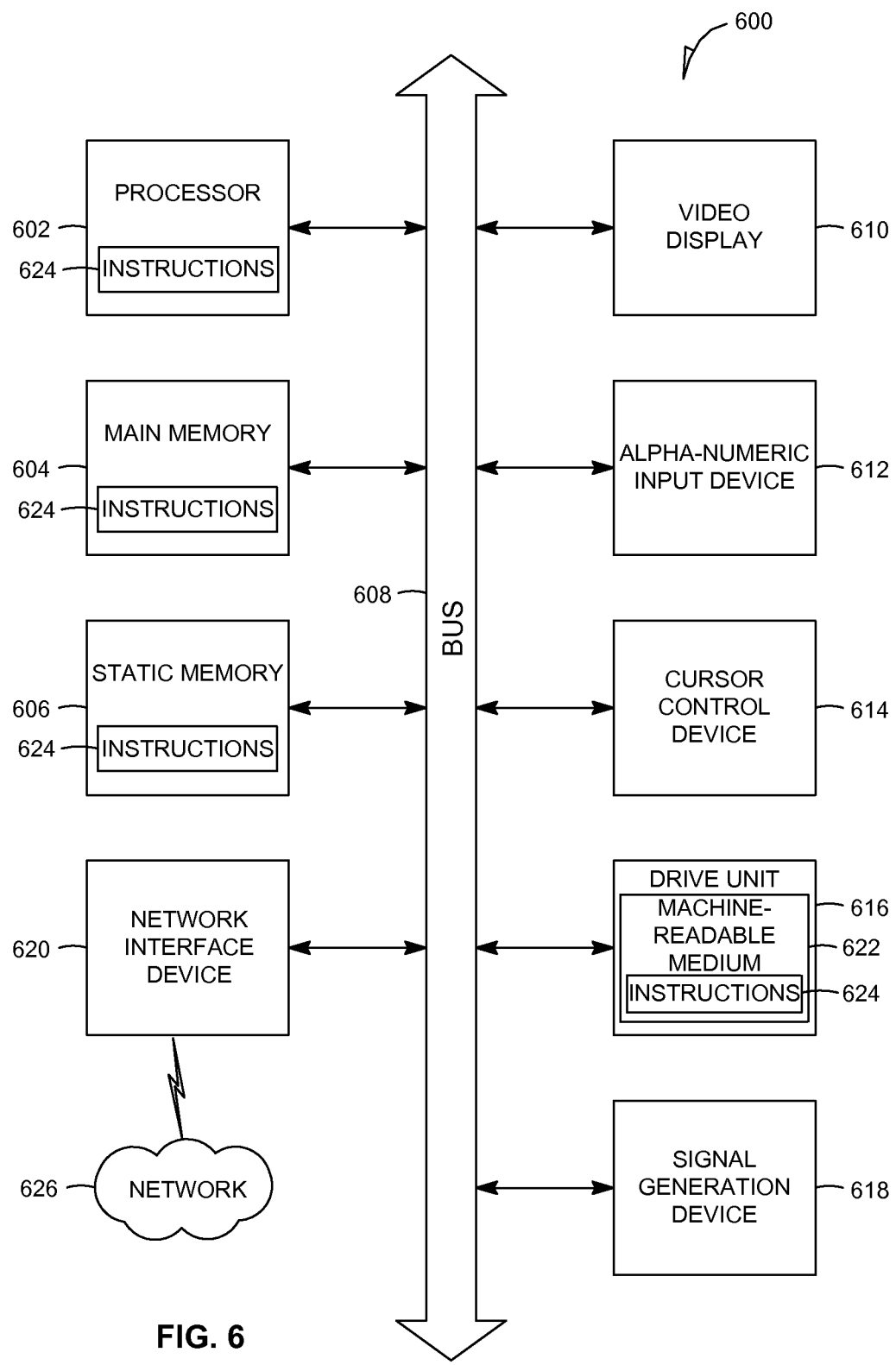
FIG. 6 illustrates a diagrammatic representation of a machine in the example form of a computer system within which a set of instructions, for causing the machine to perform any one or more of the methodologies of FIG. 3 according to some embodiments.

FIG. 6 shows a diagrammatic representation of a machine in the example form of a computer system 600 within which a set of instructions, for causing the machine to perform any one or more of the methodologies discussed herein, may be executed. The computer system 600 comprises, for example, any of the client devices 104, server 106, database 108, or database server 110. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a tablet, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystal display (LCD), organic light emitting diode (OLED), touch screen, or a cathode ray tube (CRT)). The computer system 600 also includes an alphanumeric input device 612 (e.g., a physical or virtual keyboard), a cursor control device 614 (e.g., a mouse, a touch screen, a touchpad, a trackball, a trackpad), a disk drive unit 616, a signal generation device 618 (e.g., a speaker) and a network interface device 620.

The disk drive unit 616 includes a machine-readable medium 622 on which is stored one or more sets of instructions 624 (e.g., software) embodying any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for applying a layout template to content, the method comprising:
   providing a layout template that includes content placeholders that have a progression order;

automatically grouping a plurality of content items included in a visual workspace into two or more different clusters, two or more of the plurality of content items being at different spatial position from each other;

determining an edited visual presentation progression order of two or more different automatically located clusters in response to a user editing request to edit distribution of content of one or more automatically located cluster to a different layout template;

determining a visual presentation progression order of the two or more different clusters by automatically locating, by one or more processors, the two or more different clusters to two or more respective content placeholders included in the layout template; and visually presenting the two or more different clusters within the layout template in the determined edited visual presentation progression order in accordance with the automatically locating of the clusters and the user editing request.

2. The method of claim 1, wherein at least one of the plurality of content items comprises a text, an image, a video, an audio, a graphic, a display element, or visual information.

3. The method of claim 1, wherein the plurality of content items are included in a presentation, document, page, screen, or single content creation space.

4. The method of claim 1, wherein the visual workspace comprises a canvas in a zooming user interface (ZUI) environment.

5. The method of claim 1, wherein the presenting of the clusters with the layout template comprises presenting a zoomable presentation of the layout template applied to the plurality of content items in the visual workspace.

6. The method of claim 1, wherein a number of clusters determined by the automatically grouping of the plurality of content items is greater than a number of the content placeholders included in the layout template.

7. The method of claim 6, wherein the automatically locating the two or more different clusters comprises distributing more than one of the clusters to the two or more respective content placeholders.

8. The method of claim 1, wherein at least one of the automatically grouping or the automatically locating is based at least in part on at least one of existing containment of the content items, visibility of the content items on a display at the same time, or aspect ratio of the display.

9. The method of claim 1, wherein the automatically grouping of the plurality of content items comprises determining each cluster based on at least one of relative spatial position, distance, rotation, size, and distribution among the plurality of content items.

10. The method of claim 1, wherein the automatically locating of the each of the clusters is based at least in part on a content creation date and time associated with each of the clusters.

11. The method of claim 1, wherein the automatically locating of the each of the clusters comprises changing at least one of a spatial position, size, or orientation of at least one of the clusters to match the respective content placeholder.

12. The method of claim 1, further comprising identifying the content placeholders included in the layout template.

13. The method of claim 1, wherein the automatically grouping occurs in response to receiving an indication of interest in the layout template from a user.

14. The method of claim 13, wherein the plurality of content items exists prior to the receiving of the indication of interest in the layout template.

15. An apparatus, comprising:
at least one memory including a plurality of layout templates;
at least one processor in communication with the memory; and
one or more modules comprising instructions stored in the memory and executed by the processor to perform operations comprising:
providing a la out template that includes content placeholders that have a progression order;
automatically grouping a plurality of content items included in a visual workspace into two or more different clusters, two or more of the plurality of content items being at different spatial position from each other;
determining an edited visual presentation progression order of two or more different automatically located clusters in response to a user editing request to edit distribution of content of one or more automatically located cluster to a different layout template;
determining a visual presentation progression order of the two or more different clusters by automatically distributing the two or more different clusters to two or more respective content placeholders included in a layout template selected from the plurality of layout templates; and
visually presenting the two or more different clusters within the layout template in the determined edited visual presentation progression order in accordance with the automatically locating of the clusters and the user editing request.

16. The apparatus of claim 15, wherein at least one of the plurality of content items comprises a text, an image, a video, an audio, a graphic, a display element, or visual information.

17. The apparatus of claim 15, wherein the visual workspace comprises a canvas in a zooming user interface (ZUI) environment.

18. The apparatus of claim 15, wherein the presenting of the clusters with the layout template comprises presenting a zoomable presentation of the layout template applied to the plurality of content in the visual workspace.

19. The apparatus of claim 15, wherein a number of clusters determined by the automatic group of the plurality of content items is greater than a number of the content placeholders included in the layout template.

20. The apparatus of claim 15, wherein the automatic distribution of the each of the clusters is based at least in part on a content creation date and time associated with each of the clusters.

21. The apparatus of claim 15, wherein the memory further includes template property information corresponding to the plurality of layout templates, the template property information including identification of the content placeholders of the layout template, and wherein the processor accesses the template property information associated with the layout template for the automatic distribution of the two or more different clusters to the two or more respective content placeholders of the layout template.

22. A non-transitory computer readable medium including instructions, when executed by a processor, causes the processor to perform operations comprising:
providing a layout template that includes content placeholders that have a progression order;

automatically grouping a plurality of content items included in a visual workspace into two or more different clusters, two or more of the plurality of content items being at different spatial position from each other;

determining an edited visual presentation progression order of two or more different automatically located clusters in response to a user editing request to edit distribution of content of one or more automatically located cluster to a different layout template;

determining a visual presentation progression order of the two or more different clusters by automatically locating, by one or more processors, the two or more different clusters to two or more respective content placeholders included in the layout template; and visually presenting the two or more different clusters within the layout template in the determined edited visual presentation progression order in accordance with the automatically locating of the clusters and the user editing request.

23. The non-transitory computer readable medium of claim 22, wherein at least one of the plurality of content items comprises a text, an image, a video, an audio, a graphic, a display element, or visual information.

24. The non-transitory computer readable medium of claim 22, wherein the visual workspace comprises a canvas in a zooming user interface (ZUI) environment.

25. The non-transitory computer readable medium of claim 22, wherein the presenting of the clusters with the layout template comprises presenting a zoomable presentation of the layout template applied to the plurality of content items in the visual workspace.

26. The non-transitory computer readable medium of claim 22, wherein a number of clusters determined by the automatically grouping of the plurality of content items is greater than a number of the content placeholders included in the layout template, and wherein the automatically locating of the two or more different clusters comprises distributing more than one of the clusters to one of the content placeholders.

27. The non-transitory computer readable medium of claim 22, wherein the automatically grouping of the plurality of content items comprises determining each cluster based on at least one of relative spatial position, distance, rotation, size, and distribution among the plurality of content items.

* * * * *

UNITED STATES PATENT AND TRADEMARK OFFICE
CERTIFICATE OF CORRECTION

PATENT NO. : 9,436,673 B2
APPLICATION NO. : 13/853008
DATED : September 6, 2016
INVENTOR(S) : Gera et al.

Page 1 of 1

It is certified that error appears in the above-identified patent and that said Letters Patent is hereby corrected as shown below:

In the Claims

In Column 14, Line 12, in Claim 15, delete "la out" and insert --layout--, therefor Signed and Sealed this
Sixth Day of March, 2018

Andrei Iancu
*Director of the United States Patent and Trademark Office*